(12) United States Patent
Wall et al.

(10) Patent No.: US 11,814,837 B2
(45) Date of Patent: Nov. 14, 2023

(54) INTUMESCENT GRID

(71) Applicant: 1824930 Alberta Ltd., Acheson (CA)

(72) Inventors: Wesley James Wall, Edmonton (CA); Adam Wall, Acheson (CA); Shekaib Adab, Acheson (CA)

(73) Assignee: 1824930 ALBERTA LTD.

( * ) Notice: Subject to any disclaimer, the term of this patent is extended or adjusted under 35 U.S.C. 154(b) by 0 days.

(21) Appl. No.: 15/669,836

(22) Filed: Aug. 4, 2017

(65) Prior Publication Data

US 2018/0038098 A1 Feb. 8, 2018

(30) Foreign Application Priority Data

Aug. 5, 2016 (CA) .................................. CA 2938283

(51) Int. Cl.
| | |
|---|---|
| *B32B 3/24* | (2006.01) |
| *E04B 1/94* | (2006.01) |
| *B05D 1/18* | (2006.01) |
| *C09D 5/18* | (2006.01) |
| *E04D 13/152* | (2006.01) |
| *C09D 7/61* | (2018.01) |
| *B05D 3/04* | (2006.01) |
| *B05D 5/00* | (2006.01) |
| *B05D 7/20* | (2006.01) |
| *C08K 3/32* | (2006.01) |

(Continued)

(52) U.S. Cl.
CPC ................ *E04B 1/947* (2013.01); *B05D 1/18* (2013.01); *B05D 3/042* (2013.01); *B05D 5/00* (2013.01); *C09D 5/185* (2013.01); *C09D 7/61* (2018.01); *E04D 13/152* (2013.01); *B05D 7/20* (2013.01); *B05D 2252/02* (2013.01); *B05D 2601/20* (2013.01); *C08K 3/04* (2013.01); *C08K 2003/323* (2013.01); *C09D 133/06* (2013.01)

(58) Field of Classification Search
CPC ....................................................... E04B 1/947
See application file for complete search history.

(56) References Cited

U.S. PATENT DOCUMENTS

| | | |
|---|---|---|
| 4,292,358 A | 9/1981 | Fryer et al. |
| 4,835,054 A | 5/1989 | Scarpa |
| 5,433,991 A | 7/1995 | Boyd, Jr. et al. |

(Continued)

FOREIGN PATENT DOCUMENTS

| | | |
|---|---|---|
| DE | 100 60 252 A1 | 1/2002 |
| DE | 10060252 A1 | 1/2002 |

(Continued)

*Primary Examiner* — William P Watkins, III
(74) *Attorney, Agent, or Firm* — CHRISTENSEN O'CONNOR JOHNSON KINDNESS PLLC

(57) ABSTRACT

An intumescent mesh has a flexible grid with a plurality of strands that form a series of openings in the flexible grid, and an intumescent coating applied to the flexible grid. The intumescent coating is made of an expandable graphite and a polymer-based carrier as ingredients and having an activation temperature above which the intumescent coating swells. The grid is sized such that the intumescent coating permits airflow through the flexible grid until the intumescent coating is exposed to temperatures at or above the activation temperature, whereupon the intumescent coating swells to seal the openings and prevent air flow through the flexible grid.

10 Claims, 5 Drawing Sheets

(51) Int. Cl.
*C08K 3/04* (2006.01)
*C09D 133/06* (2006.01)

(56) References Cited

U.S. PATENT DOCUMENTS

| | | | |
|---|---|---|---|
| 6,809,129 B2 * | 10/2004 | Abu-Isa | C08K 3/0008 |
| | | | 428/500 |
| 6,960,388 B2 | 11/2005 | Hallissy et al. | |
| 7,191,845 B2 | 3/2007 | Loar | |
| 7,413,024 B1 | 8/2008 | Simontacchi et al. | |
| 8,461,244 B2 | 6/2013 | Taylor et al. | |
| 8,808,850 B2 | 8/2014 | Dion et al. | |
| 10,442,937 B2 | 10/2019 | Peskens et al. | |
| 11,192,335 B2 | 12/2021 | Song et al. | |
| 2008/0220714 A1 * | 9/2008 | Caruso | E04D 13/152 |
| | | | 454/365 |
| 2009/0142495 A1 | 6/2009 | Green et al. | |
| 2011/0311830 A1 | 12/2011 | Wade | |
| 2016/0160059 A1 * | 6/2016 | Anderson | C09D 163/00 |
| | | | 523/179 |
| 2016/0272891 A1 | 9/2016 | Tong et al. | |

FOREIGN PATENT DOCUMENTS

| | | |
|---|---|---|
| DE | 202014103155 U1 | 8/2014 |
| EP | 2 236 690 A1 | 10/2010 |
| GB | 2072046 A | 9/1981 |
| GB | 2475258 A | 5/2011 |
| JP | 2000014816 A | 1/2000 |
| KR | 10-2015-0144460 A | 12/2015 |
| WO | 2007100510 A2 | 9/2007 |
| WO | 2015/084739 A1 | 6/2015 |
| WO | 2015/155546 A1 | 10/2015 |
| WO | 2015/155547 A1 | 10/2015 |
| WO | 2015/157278 A1 | 10/2015 |
| WO | 2016094763 A1 | 6/2016 |

* cited by examiner

INTUMESCENT GRID

TECHNICAL FIELD

This relates to a grid or mesh, and in particular, a grid or mesh that is coated with an intumescent material.

BACKGROUND

Intumescent coatings are a class of substances that swell when exposed to high temperatures. The swollen layer generally has a low thermal conductivity. As a result, intumescent coatings are often used as a passive fire resistance measure in buildings and other applications.

SUMMARY

According to an aspect, there is provided an intumescent mesh, comprising a flexible grid comprising a plurality of strands that form a series of openings in the flexible grid. An intumescent coating is applied to the flexible grid, the intumescent coating comprising expandable graphite and a polymer-based carrier as ingredients and having an activation temperature above which the intumescent coating swells. The grid is sized such that the intumescent coating permits airflow through the flexible grid until the intumescent coating is exposed to temperatures at or above the activation temperature, whereupon the intumescent coating swells to seal the openings and prevent air flow through the flexible grid.

According to other aspects, the flexible grid may comprise a wire cloth, which may have a ¼ inch mesh size, and the grid and intumescent coating may be sized such that the available airflow area is approximately 40-70% of the area of the flexible grid.

According to an aspect, there is provided a method of manufacturing an intumescent mesh, comprising the steps of: passing a flexible grid through a bath of a liquid intumescent material to coat the flexible grid with intumescent material, wherein the flexible grid comprises a plurality of strands that form a series of openings in the flexible grid, and the intumescent coating comprises expandable graphite and a polymer-based carrier as ingredients and having an activation temperature above which the intumescent coating swells; and permitting the liquid intumescent material to solidify on the flexible grid such that the intumescent coating permits airflow through the flexible grid until the intumescent coating is exposed to temperatures at or above the activation temperature, whereupon the intumescent coating swells to seal the openings and prevent air flow through the flexible grid.

According to other aspects, the flexible grid may comprise a wire cloth, which may have a ¼ inch mesh size, the grid and intumescent coating may be sized such that the available airflow area is approximately 40-70% of the area of the flexible grid, the method may further comprise the step of, prior to permitting the liquid intumescent material to solidify, subjecting the grid to air pressure to open any openings closed by the intumescent material, and the flexible grid may be passed through the bath more than once to increase a thickness of the intumescent material coating.

According to an aspect, there is provided a method of increasing the fire resistance of a structure, comprising the steps of: installing an intumescent mesh on a surface of the structure to be protected, the intumescent mesh comprising a flexible grid of a plurality of strands that form a series of openings in the flexible grid and an intumescent coating applied to the flexible grid, the intumescent coating comprising expandable graphite and a polymer-based carrier as ingredients and having an activation temperature above which the intumescent coating swells, wherein the grid is sized such that the intumescent coating permits airflow through the flexible grid until the intumescent coating is exposed to temperatures at or above the activation temperature, whereupon the intumescent coating swells to seal the openings and prevent air flow through the flexible grid; wherein the intumescent mesh is affixed in contact with the structure such that, upon exposing the intumescent mesh to a temperature at or above the activation temperature, the intumescent coating swells to seal against and displace any air immediately adjacent to the surface of the structure.

According to other aspects, the flexible grid may comprise a wire cloth, which may have a ¼ inch mesh size, and the grid and intumescent coating may be sized such that the available airflow area is approximately 40-70% of the area of the flexible grid.

In other aspects, the features described above may be combined together in any reasonable combination as will be recognized by those skilled in the art.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
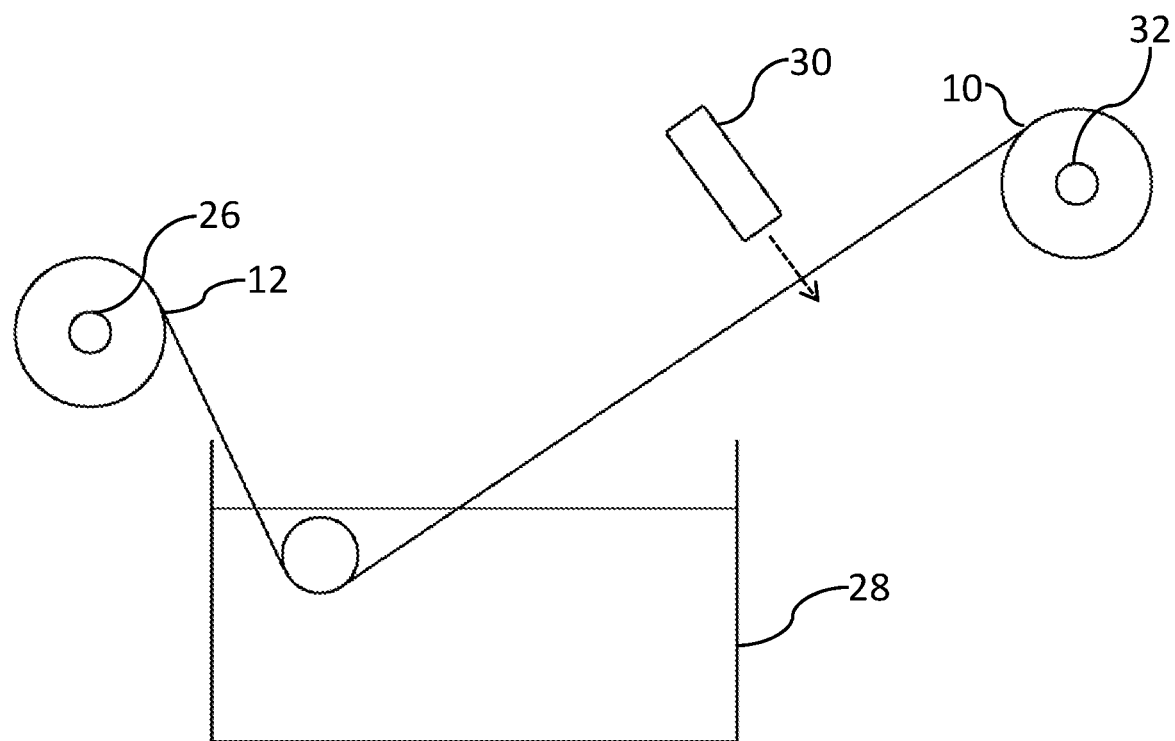
FIG. 1 is a schematic view of a process of manufacturing an intumescent grid

An intumescent grid, generally identified by reference numeral 10, will now be described with reference to FIG. 1 through 7.

Figure 2:
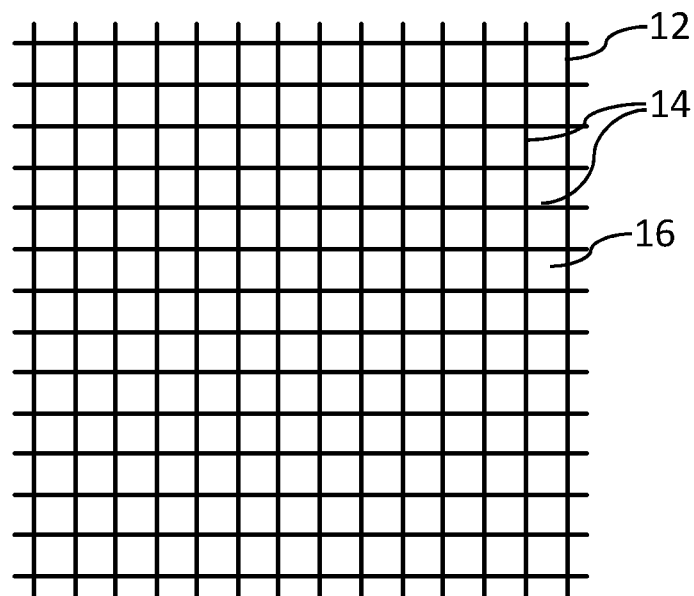
FIG. 2 is a top plan view of an intumescent grid.

Referring to FIG. 2, intumescent mesh 10 is made from a flexible grid 12 comprising a plurality of strands 14 that form a series of openings 16 in flexible grid 12. Preferably, flexible grid 12 is a wire cloth that has square openings as shown. It will be understood that other styles of flexible grid 12 may be used, as long as the material used and dimensions are adequate for the designated purpose.

Figure 3:
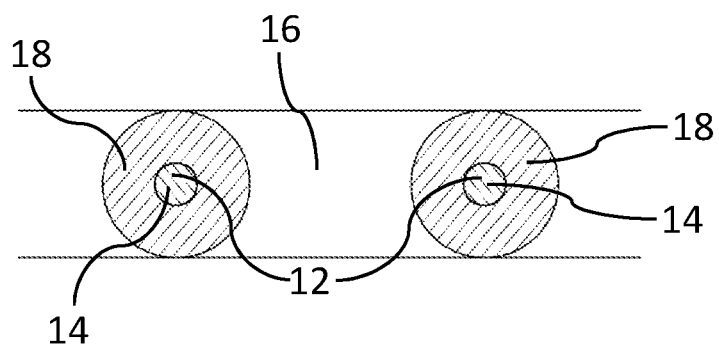
FIG. 3 is a side elevation view in section of an intumescent mesh.
Figure 4:
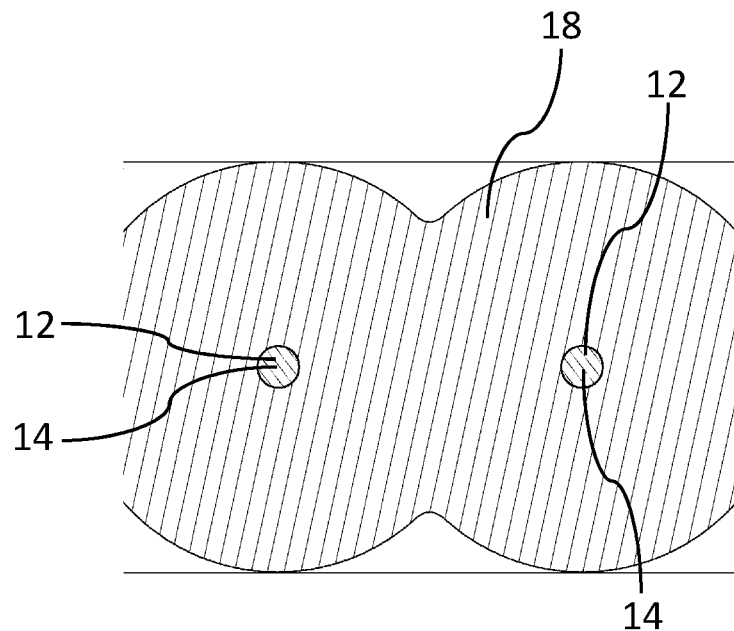
FIG. 4 is a side elevation view in section of an intumescent mesh after application of a temperature at or above the activation temperature.

Referring to FIG. 3, an intumescent coating 18 is applied to flexible grid 12. Intumescent coating is made using expandable graphite and a polymer-based carrier. In one example, a suitable formula may be as follows: acrylic copolymer (35-56 w/w %), ammonium polyphosphate (3-21 w/w %), expandable graphite (3-21 w/w %), silica (<1 w/w %), and wire mesh (30-49 w/w %). The expandable graphite primarily contributes to the intumescent properties, while the acrylic copolymer is the primary carrier for the expandable graphite. Modifications to this formula may be made, with some components being replaced or removed, and/or other components added as will be recognized by those stilled in the art. Intumescent coating 18 is designed to have an activation temperature above which the intumescent coating swells, as shown in FIG. 4. The activation temperature may be around 600° C. or higher, however this may be customized or selected to be higher or lower than this temperature based on the type of expandable graphite used, as is known in the art and characterized elsewhere.

Intumescent coating 18 is also designed to be sufficiently flexible to avoid palling, flaking, or otherwise falling off flexible grid 12 as grid 12 is manipulated and bent during installation. In addition, intumescent mesh 10 is particularly designed to be used in outdoor applications where intumescent coating 18 will be exposed to the elements without degrading. As such, intumescent coating 18 is preferably designed to withstand temperature extremes that may be encountered, such as low temperatures that may be encountered in cold climates, and the high temperatures that may be encountered in warm climates, and when exposed to direct sunlight without expanding or swelling prematurely. Furthermore, intumescent coating 18 should be designed to withstand exposure to water without degrading.

Figure 4A:
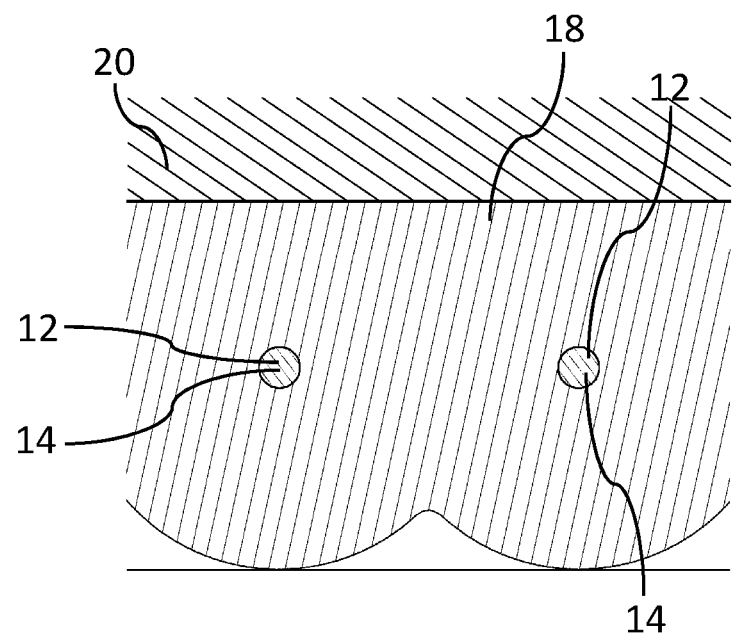
FIG. 4A is a side elevation view in section of an intumescent mesh after application of a temperature at or above the activation temperature protecting a structure.
Figure 5:
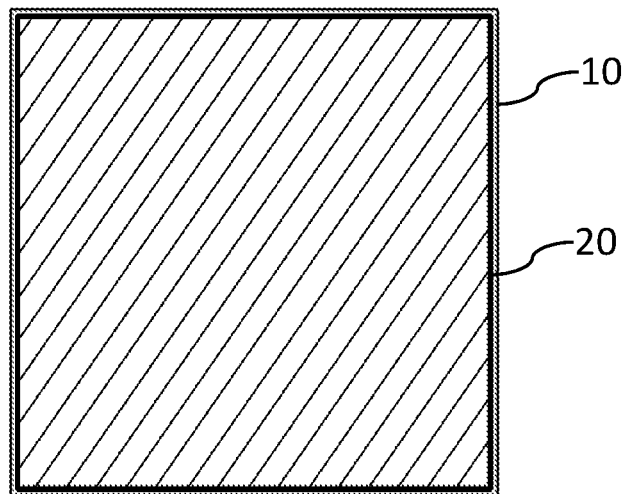
FIG. 5 is a top plan view in section of a square structure being protected by an intumescent mesh.
Figure 6:
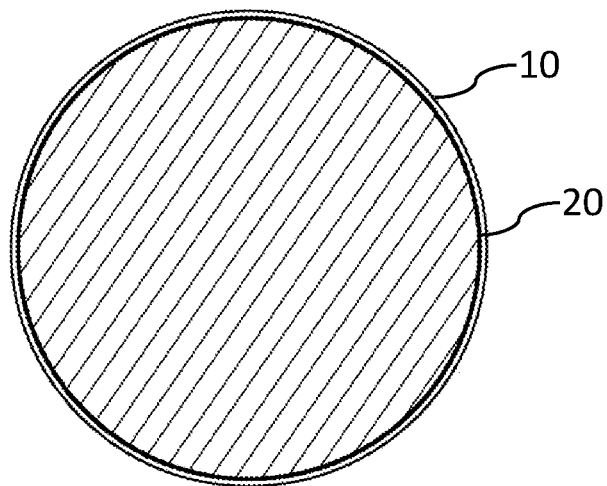
FIG. 6 is a top plan view in section of a round structure being protected by an intumescent mesh.

Intumescent mesh 10 is designed to allow for airflow, such as may be required to allow a structure 20 to remain dry when mesh 10 is attached, as shown in FIGS. 5 and 6. When installed on structure 20, mesh 10 is installed tightly and immediately against structure 20 such that, as coating 18 expands or swells when exposed to high temperatures, coating 18 not only seals openings 16, but also swells and seals against structure 20, and displaces any air adjacent to structure 20, such that no air is present to fuel a fire, as shown in FIG. 4A. By properly designing mesh 10, including the distribution of intumescent coating 18, its expandability, and its size, and by installing it sufficiently close to structure 20, it is possible to seal openings 16 to provide a thermal barrier and stop the passage of heated gases, while also creating a seal against structure 20, such that any air in contact with structure 20 is displaced away from structure 20. Without oxygen, the fire cannot spread to structure 20, regardless of the temperature or amount of heat transferring through the expanded coating 18, such that the fire can be retarded until the intumescent material degrades sufficiently until the seal is broken.

Figure 7:
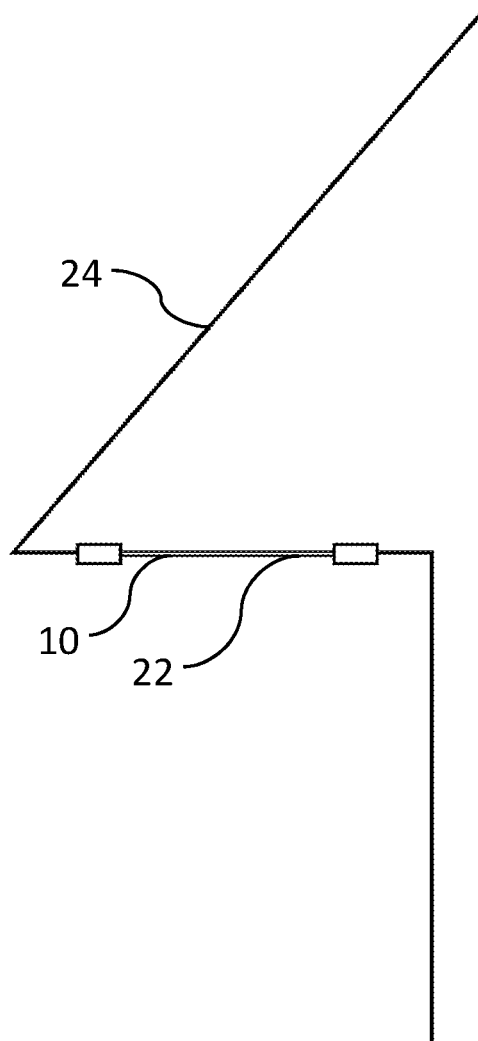
FIG. 7 is a side elevation view in section of an intumescent mesh installed as a soffit of a building.

Referring to FIG. 7, intumescent mesh 10 may also be installed as a soffit 22 of a building 24, as shown in FIG. 7. Soffit 22 allows sufficient air to pass through soffit 22, while sealing soffit 22 in the event of a fire. One embodiment was tested and was found to pass the California building codes for soffits, which require any soffit 22 to stop embers and flames from passing through soffit 22.

It has been found that a mesh size of about ¼+/−¹⁄₁₆ inches, with an adequately thick intumescent coating, allows for suitable fire protection, while still allowing for sufficient airflow. In one example, suitable airflow may be achieved when the openings account for roughly half of the surface area of the mesh, or approximately 40-70% of the area of flexible grid 12. The actual amount will be a balance between the expandability of intumescent coating 18, and the dimensions of mesh 10, including the separation between strands 14, in order to ensure that intumescent coating 18 is able to seal openings 16 and preferably against structure 20 in the event of a fire, while still permitting sufficient air flow to prevent moisture damage behind mesh 10. Some allowance may be made for the possibility that certain openings 16 may be closed during the manufacturing process, which may be minimized by controls in the manufacturing process. When intumescent coating 18 is exposed to temperatures at or above the activation temperature, intumescent coating 18 swells to seal openings 16 and prevent air flow through flexible grid 12.

In one example, referring to FIG. 1, intumescent mesh 10 is manufactured by providing a first roll 26 of flexible grid 12, which passes through a bath 28 filled with liquid intumescent material. After being withdrawn from bath 28, the coated grid 12 passes by a source of air pressure, such as an air knife 30, which applies an air pressure to grid 12 that is sufficiently strong to open any openings 16 of grid 12 that may be closed by the surface tension of liquid intumescent material, while being insufficiently strong to remove a significant portion of the intumescent material from grid 12. Intumescent coating 18 is permitted to cure and harden into a solid before being rolled on a second roll 32. Depending on the necessary thickness of intumescent coating 18, and the viscosity of the intumescent material in bath 28, multiple passes may be required to achieve the desired product. In addition, by passing mesh 10 through bath 28, both sides of grid 12 and all sides of strands 14 are coated.

The dimensions of mesh 10 will vary depending on its intended use. In one example, a roll that is 3-4 feet wide and about 50 feet long may be made that is small and light enough to be handled by a worker. Other dimensions may also be used depending on the intended use and the preferences of the user. Those skilled in the art will be able to make any necessary modifications to the equipment for making and handling the intended size of mesh 10.

In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The scope of the following claims should not be limited by the preferred embodiments set forth in the examples above and in the drawings, but should be given the broadest interpretation consistent with the description as a whole.

What is claimed is:

1. An intumescent mesh, comprising:
   a flexible grid comprising a plurality of strands that form a series of openings in the flexible grid;
   an intumescent coating applied to the flexible grid, the intumescent coating comprising expandable graphite and a polymer-based carrier as ingredients and having an activation temperature above which the intumescent coating swells;
   wherein the flexible grid with the intumescent coating applied is rollable into a roll, and is sized such that the intumescent coating permits airflow through the series of openings until the intumescent coating is exposed to temperatures at or above the activation temperature, whereupon the intumescent coating swells to seal the openings and prevent air flow through the flexible grid, the intumescent coating being applied substantially equally to all sides of the strands and wherein the intumescent coating comprises a mixture of acrylic copolymer, ammonium polyphosphate, expandable graphite, and silica, such that a composition of the intumescent mesh comprises between 35-56 w/w % acrylic copolymer, between 3-21 w/w % ammonium polyphosphate, between 3-21 w/w % expandable graphite, and less than 1 w/w % silica, and the flexible grid comprising between 30 and 49 w/w %.

2. The intumescent mesh of claim 1, wherein the flexible grid comprises a wire cloth that has a weight ratio of between 30 and 49% within the intumescent mesh.

3. The intumescent mesh of claim 1, wherein the flexible grid is sufficiently flexible to form 90 degree corners.

4. In combination:
a structure having an outer wall that is flammable and exposed to weather; and
an intumescent mesh, comprising:
- a flexible grid comprising a plurality of strands that form a series of openings in the flexible grid;
- an intumescent coating applied to the flexible grid, the intumescent coating comprising expandable graphite and a polymer-based carrier as ingredients and having an activation temperature above which the intumescent coating swells;
- wherein the flexible grid with the intumescent coating applied is rollable into a roll, and is sized such that the intumescent coating permits airflow through the series of openings until the intumescent coating is exposed to temperatures at or above the activation temperature, whereupon the intumescent coating swells to seal the openings and prevent air flow through the flexible grid, the intumescent coating being applied substantially equally to all sides of the strands the intumescent coating comprising a mixture of acrylic copolymer, ammonium polyphosphate, expandable graphite, and silica, such that a composition of the intumescent mesh comprises between 35-56 w/w % acrylic copolymer, between 3-21 w/w % ammonium polyphosphate, between 3-21 w/w % expandable graphite, and less than 1 w/w % silica, and the flexible grid comprising between 30 and 49 w/w %;
wherein the intumescent mesh is affixed to the structure such that the intumescent mesh encloses a perimeter of the structure by flexibly conforming to the outer wall of the structure, such that, upon exposing the intumescent mesh to a temperature at or above the activation temperature, the intumescent coating swells to displace air that is immediately adjacent to the outer wall and form a fire resistant seal against the outer wall.

5. The combination of claim 4, wherein the flexible grid comprises a wire cloth having a weight ratio of between 30 and 49% within the intumescent mesh.

6. The combination of claim 4, wherein the outer wall of the structure comprises at least one 90 degree corner.

7. The intumescent mesh of claim 1, wherein the strands define a mesh size of about ¼+/−1/16 inches, and the intumescent coating is applied such that the available airflow area is approximately 40-70% of the area of the flexible grid.

8. The intumescent mesh of claim 1, comprising a non-zero amount of silica.

9. The combination of claim 4, wherein the strands define a mesh size of about ¼+/−1/16 inches, and the intumescent coating is applied such that an available airflow area is approximately 40-70% of the area of the flexible grid.

10. The combination of claim 4, comprising a non-zero amount of silica.

* * * * *